United States Patent [19]
Asaida et al.

[11] Patent Number: 5,095,364
[45] Date of Patent: Mar. 10, 1992

[54] COLOR TELEVISION CAMERA INCLUDING RATE CONVERTING UNIT AND LOW PASS FILTER CIRCUIT FOR LIMITING FREQUENCY RANGE OF AN OUTPUT COMPOSITE VIDEO SIGNAL

[75] Inventors: Takashi Asaida; Kazuyoshi Miyamoto, both of Kanagawa, Japan

[73] Assignee: Sony Corporation, Tokyo, Japan

[21] Appl. No.: 587,066

[22] Filed: Sep. 24, 1990

[30] Foreign Application Priority Data

Sep. 26, 1989 [JP] Japan ........................... 1-249836
Oct. 25, 1989 [JP] Japan ........................... 1-278206

[51] Int. Cl.$^5$ ............................................. H04N 9/04
[52] U.S. Cl. ........................................ 358/41; 358/51
[58] Field of Search ............... 358/23, 30, 41, 44, 358/50, 51

[56] References Cited

U.S. PATENT DOCUMENTS 4,614,966 9/1986 Yunoki et al. ...................... 358/44
5,043,803 8/1991 Asaida .............................. 358/51

FOREIGN PATENT DOCUMENTS 60-212067 10/1985 Japan ............................ 358/29 C Primary Examiner—James J. Groody
Assistant Examiner—Kim Yen Vu
Attorney, Agent, or Firm—Alvin Sinderbrand; William S. Frommer

[57] ABSTRACT

A color television camera having an image pickup unit for providing three-color image pickup signals at a predetermined rate fs includes an analog/digital converting unit for digitizing an output signal of the image pickup unit at a clock rate equal to the rate fs, a first rate converting unit for interpolating and converting the rate of the digitized image pickup signals into three-color digital image signals having a rate 2fs, a signal processing unit supplied with the rate-converted three-color digital image signals for forming a digital compositive video signal at the 2fs rate, a digital low-pass filter supplied with the digital composite video signal from the signal processing unit for limiting the frequency range of the digital composite video signal to less than about fs/2, and a second rate converting unit coupled to the digital low-pass filter for converting the rate of the frequency limited digital composite video signal to fs.

16 Claims, 13 Drawing Sheets

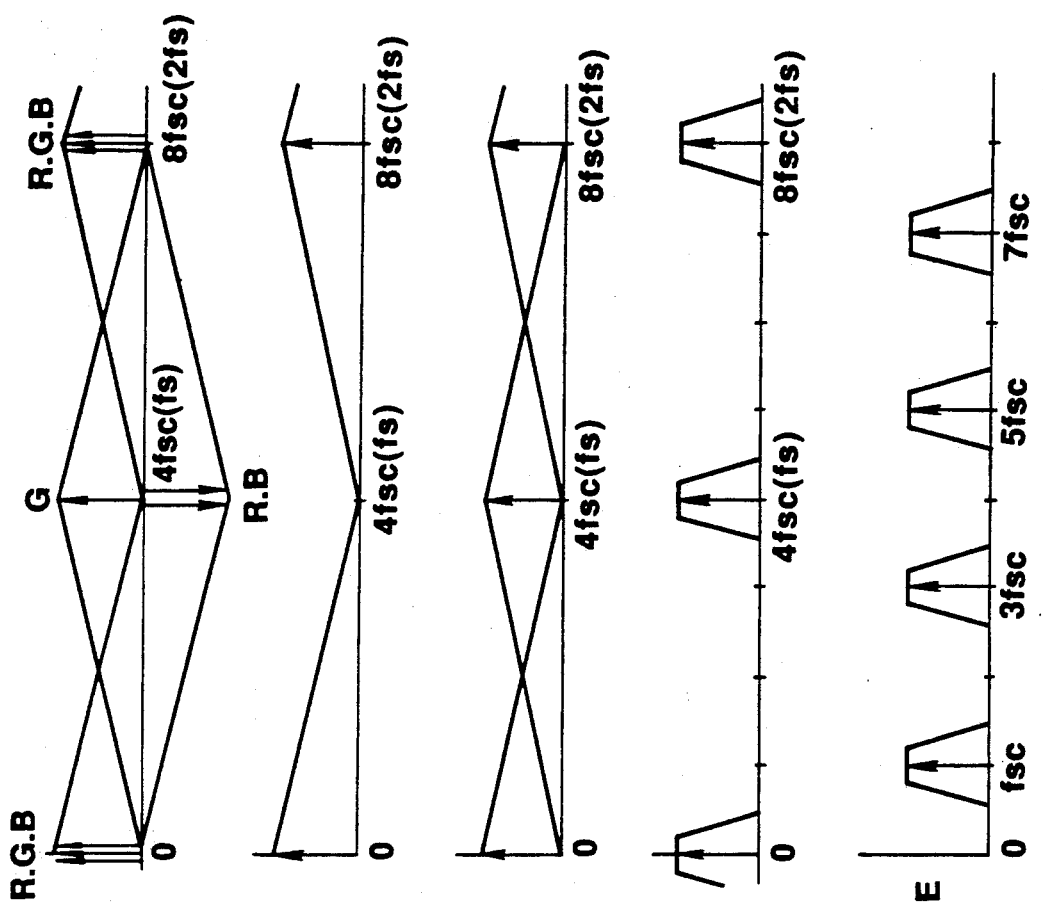

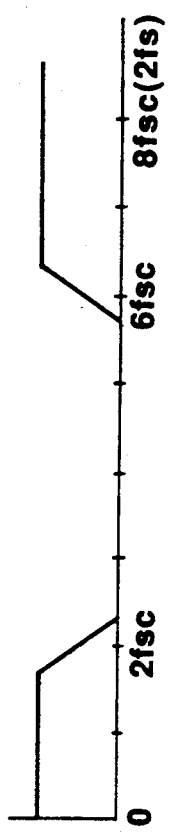
FIG.3(F) INTERPOLATING FILTER CHARACTERISTICS
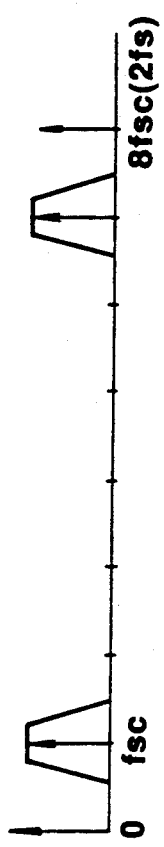
FIG.3(G) MODULATED COLOR DIFFERENCE SIGNAL (MOD.C**)
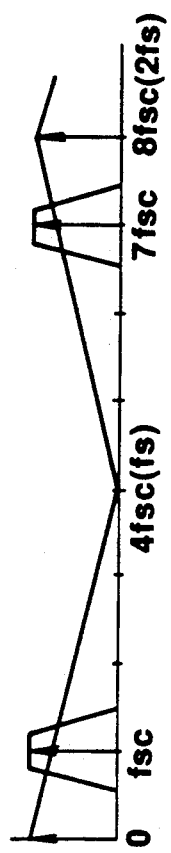
FIG.3(H) COMPOSITE VIDEO SIGNAL (DScs**)
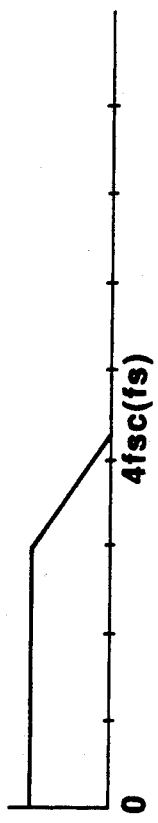
FIG.3(I) POSTFILTER CHARACTERISTICS
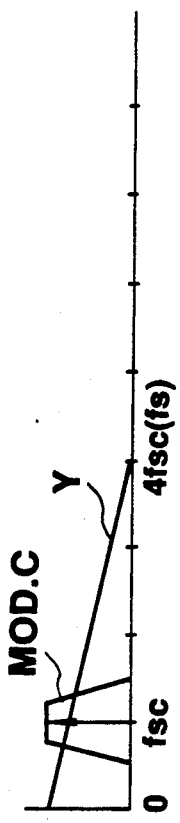
FIG.3(J) COMPOSITE VIDEO SIGNAL (CS)

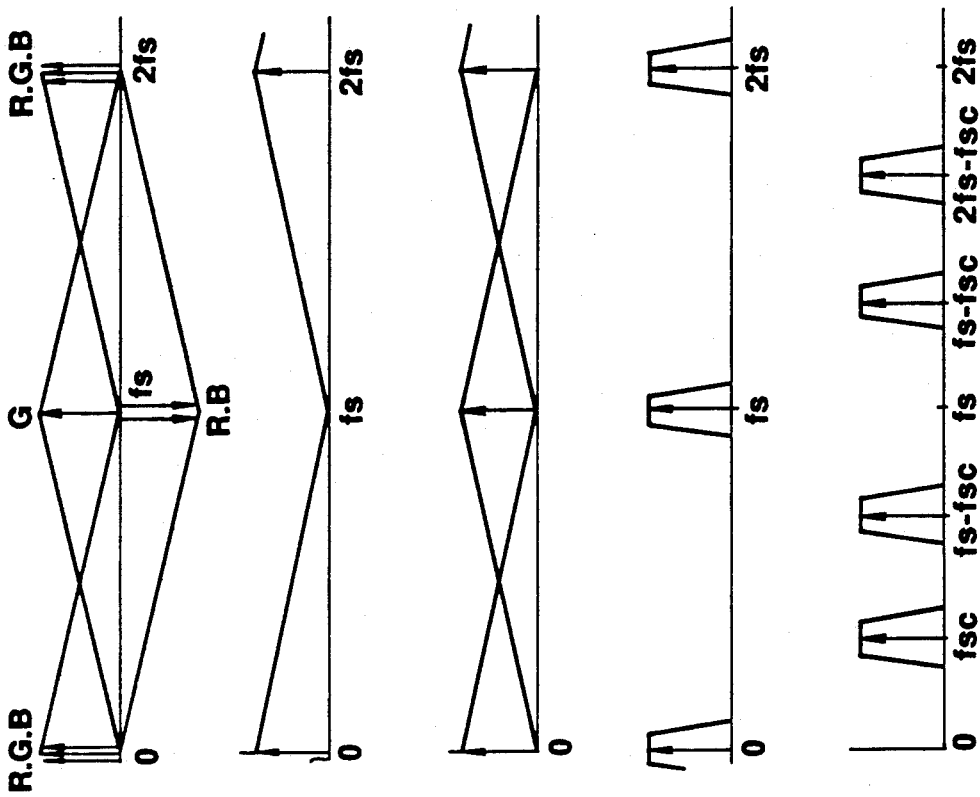

FIG. 6(F) INTERPOLATING FILTER CHARACTERISTICS
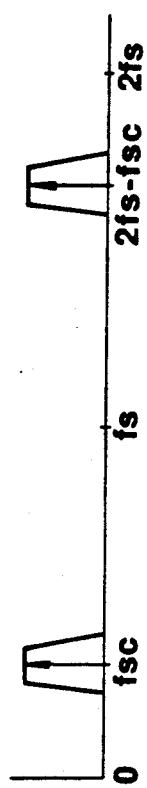
FIG. 6(G) MODULATED COLOR DIFFERENCE SIGNAL (MOD.C**)
FIG. 6(H) COMPOSITE VIDEO SIGNAL (DScs**)
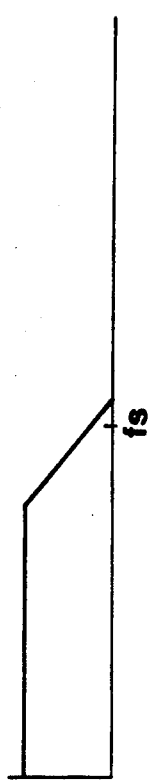
FIG. 6(I) POSTFILTER CHARACTERISTICS
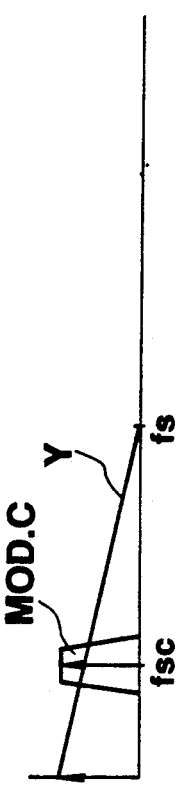
FIG. 6(J) COMPOSITE VIDEO SIGNAL (CS)

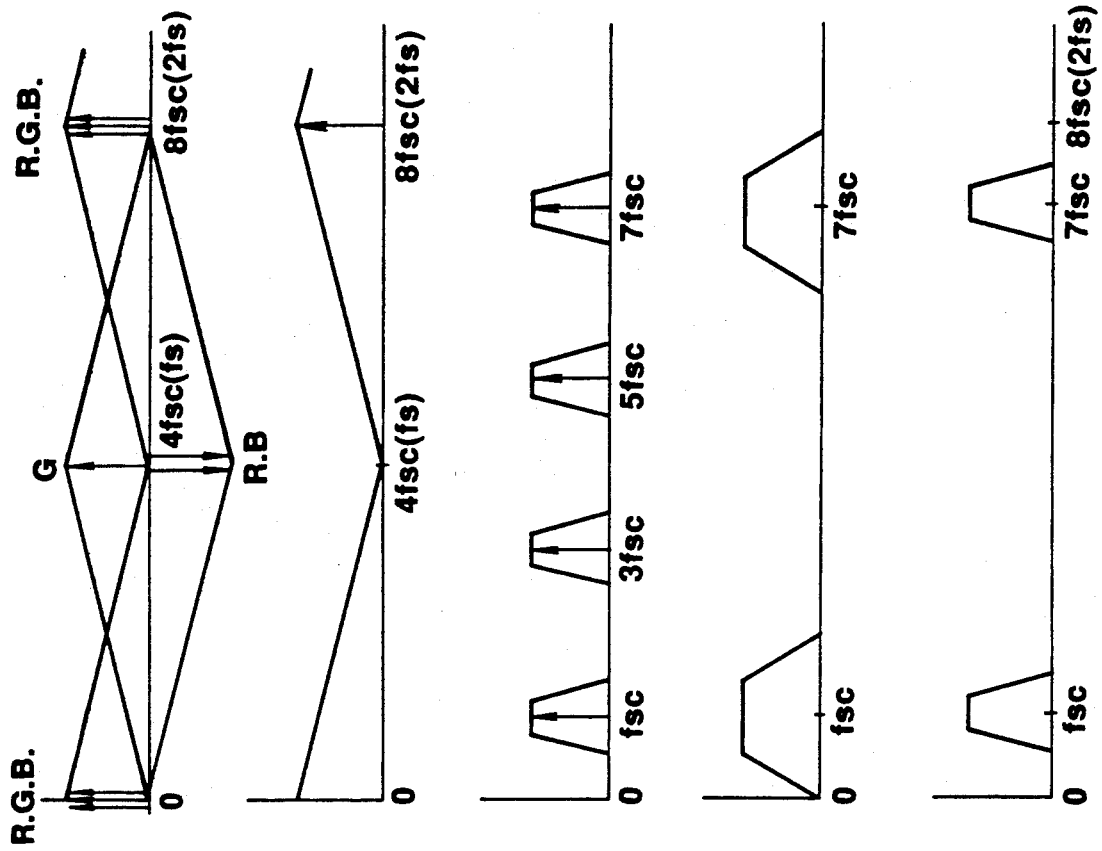

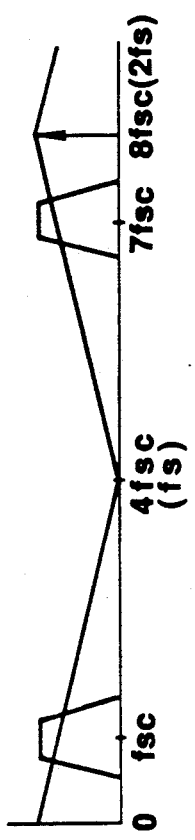
FIG.12(F) ADDITION OUTPUT
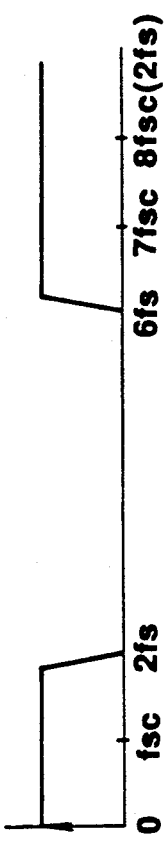
FIG.12(G) PREFILTER CHARACTERISTICS
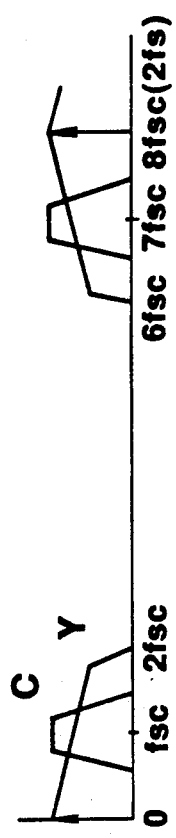
FIG.12(H) PREFILTER OUTPUT
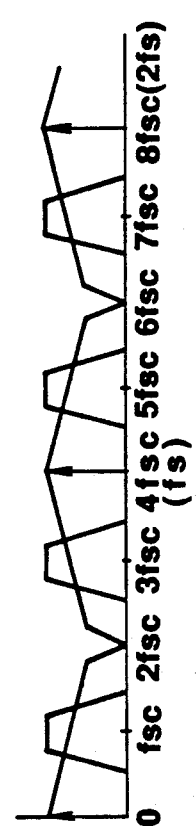
FIG.12(I) DIGITAL COMPOSITE VIDEO SIGNAL

COLOR TELEVISION CAMERA INCLUDING RATE CONVERTING UNIT AND LOW PASS FILTER CIRCUIT FOR LIMITING FREQUENCY RANGE OF AN OUTPUT COMPOSITE VIDEO SIGNAL

FIELD OF THE INVENTION

This invention relates to a color television camera and, more particularly, to a color television camera in which digital signal processing is performed on output signals of an imaging or image pickup device.

DESCRIPTION OF THE PRIOR ART

In a conventional solid-state imaging system in which a solid-stage image sensor having a discrete pixel structure constituted by charge coupled devices (CCDs) is used in an imaging section, the solid-state image sensor itself constitutes a sampling system. Consequently, aliasing components from the spatial sampling frequency fs used to sample the CCDs are mixed in a known manner into image pickup output signals from the solid-state image sensor.

In a color television camera adapted to produce a color image, it has been proposed to use a dual type CCD solid-state imaging apparatus for forming a three-color image in which one solid-state image sensor forms a green color image and another solid-state image sensor having color coding light filters forms red and blue color images. It also has been proposed to use a three CCD type solid-state imaging apparatus for forming a three-color image by using separate solid-state image sensors for each color.

A so-called spatial offsetting technique for improving resolution in the three CCD type solid-state imaging apparatus is known. In this technique the solid-state image sensors for forming the red color image and the blue color image are arrayed with an offset equal to one-half the spatial pixel sampling period with respect to the solid-state image sensor for forming the green color image The resultant analog output from the three CCD solid-state imaging apparatus exhibits a high resolution surpassing the restrictions imposed by the number of pixels of the solid-state image sensor.

In a color television camera in which the output signals of solid-state image pickup devices are digitized, the digitizing operation is performed at a clock rate fs which is about four times the color subcarrier frequency fsc (fs=4 fsc). For eliminating adverse effects caused by high harmonics of the color subcarrier frequency fsc, the output frequency band of the composite video signals, obtained upon mixing the luminance signal Y with modulated color difference signal MOD.C, is limited to not more than 2 fsc. One example of a color television camera in which the output signals of the solid-state image pickup devices are digitized is described in U.S. Pat. No. 4,490,738.

To improve the picture quality of the television images, attempts have been made towards increasing the bandwidth of the television signals However, in the color television camera having an image pickup device formed of solid-state image sensors with a discrete pixel structure, such as CCDs, the color signal components are restricted because if the output band of the composite vide signals is increased to more than 2 fsc, harmonic distortion in the color subcarrier frequency and deterioration in the picture quality may result.

On the other hand, when digital interfacing for the so-called D1/D2 digital recording format is used for connecting to a solid-state image pickup system employing a solid-state image sensor having a discrete pixel structure, the digital rate is increased excessively if the sampling rate of the digital interface unit is set to 2 fs, while the standards for digital interfacing nevertheless are not satisfied. In addition, use of the sampling rate for a digital processing system consistent with existing standards, such as the D1/D2 format results in deteriorated resolution as compared to the sampling rate for a solid-state image pickup device used with an analog processing system to produce an analog output directly.

OBJECTS

It is a principal object of the present invention to provide a color television camera which meets signal standards for digital video or associated equipment and exhibits a superior modulation transfer function (MTF) while producing high quality digital composite video signals containing a lesser amount of aliasing components.

It is another object of the present invention to provide a color television camera which produces high resolution composite video signals without unnecessarily suppressing color signals and without concomitant generation of harmonic distortion of the color sub-carrier component.

SUMMARY OF THE INVENTION

In accordance with the present invention a color television camera having image pickup means for providing three primary color image pickup signals at a predetermined rate fs, is comprised of analog/digital converting means for digitizing output signals from said image pickup means at a clock rate equal to said rate fs, first rate converting means for interpolating and converting output signals form said analog/digital converting means into three primary color image pickup digital signals having a rate equal to 2 fs which is twice the rate fs, signal processing means supplied with output signals from said first rate converting means and adapted to form digital composite video signals from the three primary color image pickup digital signals at the converted rate 2 fs, a digital low-pass filter supplied with output signals from said signal processing means and adapted to limit the pas band of said digital composite video signals to about less than fs/2, and second rate converting means supplied with output signals from said signal processing means and adapted to convert the rate of the digital composite video signals supplied thereto to fs.

The present invention also provides a color television camera having image pickup means for producing three primary color image pickup signals at a predetermined rate fs, and comprising analog/digital converting means for digitizing output signals from said image pickup means at a clock rate equal to said rate fs, first rate converting means for interpolating and converting output signals from said analog/digital converting means into three primary color digital image pickup signals having a rate equal to 2 fs which is twice the rate fs, luminance signal forming means supplied with an output signal of said first rate converting means and adapted to form a digital luminance signal at the 2 fs rate from the three primary color digital image pickup signals having the 2 fs rate color, difference signal forming means supplied with the output signal of said rate converting means and adapted for forming digital color difference signals at the fs rate from said three primary color digital signals at the 2 fs rate, modulating means supplied with output signals from said color difference signal forming means and adapted for modulating said digital color difference signals having the fs rate, second rate converting means for converting said digital color difference signals modulated by said modulating means into modulated digital color difference signals having the 2 fs rate, composite video signal forming means for forming a digital composite video signal at the 2 fs rate from said digital luminance signal outputted from said luminance signal forming means and from said modulated digital color difference signals having the 2 fs rate, digital/analog converting means for converting the output signal from said composite video signal forming means into an analog form, and a low-pass filter supplied with the output signal from said digital to analog converting means and adapted to pass a signal component of a frequency lower than said frequency fs.

BRIEF DESCRIPTION OF THE DRAWINGS

FIGS. 3A to 3J are diagrammatic views for illustrating the operation of the color television camera shown in FIG. 1.

FIGS. 6A to 6J are diagrammatic views for illustrating the operation of the color television camera of the PAL system to which the present invention may be applied.

FIGS. 12A to 12I are diagrammatic views for illustrating the operation of the color television camera shown in FIG. 9.

DETAILED DESCRIPTION OF PREFERRED EMBODIMENTS

An embodiment of color television camera apparatus according to the present invention will be hereinafter explained by referring to the accompanying drawings.

Figure 1:
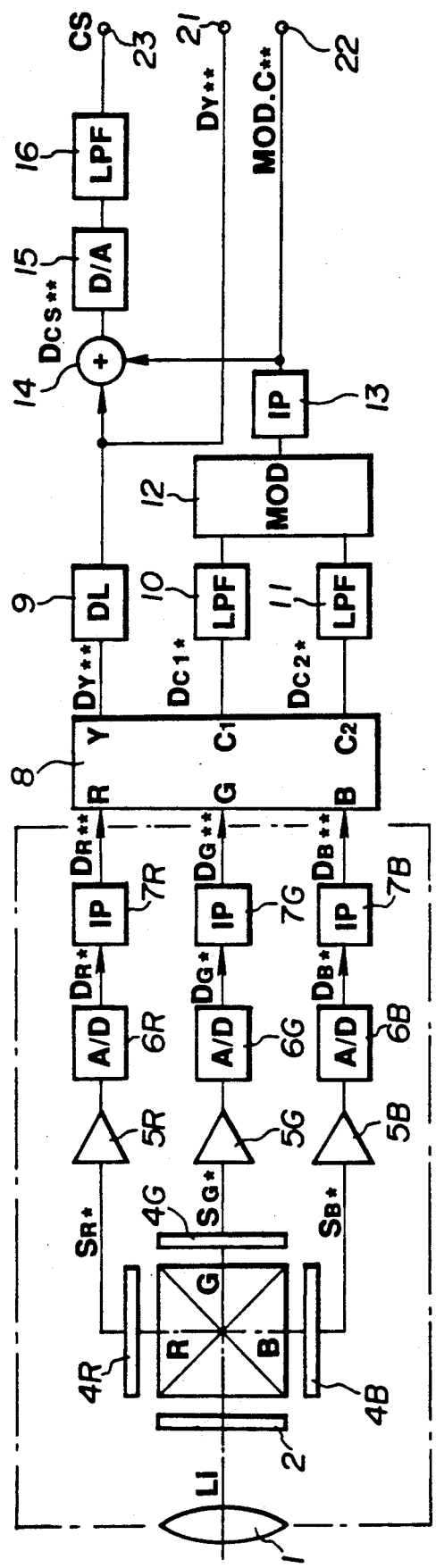
FIG. 1 is a block diagram showing an embodiment of a color television camera of the present invention.

A color television camera according to the present invention is constructed as shown in FIG. 1.

The color television camera shown in FIG. 1 is a color television camera of the NTSC system having a three-sensor type solid-state imaging apparatus in which imaging light Li incident from an imaging lens 1 via optical low-pass filter 2 is separated by a color separating prism 3 into three primary color light components for imaging three primary color images of the object on three CCD image sensors 4R, 4G and 4B.

Figure 2:
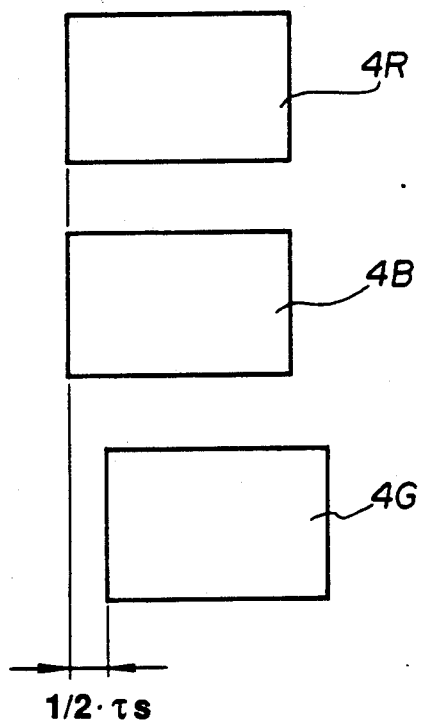
FIG. 2 is a diagrammatic view showing a relative array of the solid-state image pickup devices used in the color television camera shown in FIG. 1.

In the present embodiment, the three CCD image sensors 4R, 4G and 4B constituting an imaging section of the color television camera are so arrayed that the CCD image sensor 4R for imaging the red color image and the CCD image sensor 4B for imaging the blue color image both are offset with respect to the CCD image sensor 4G for imaging the green color image by one-half the spatial sampling period $\tau_s$, or $\frac{1}{2}\tau_s$, as shown in FIG. 2. The three CCD image sensors 4R, 4G and 4B are driven by a CCD driving circuit, not shown, so that the imaging charges of the pixels are read by read-out clocks of a sampling frequency fs which is equal to four times the color subcarrier frequency fsc, or 4 fsc.

The three CCD image sensors 4R, 4G and 4B, using the above-mentioned spatial offsetting technique, produce spatial samplings of the three primary color images of the object image such that the CCD image sensor 4G for green color image pickup on the one hand and the CCD image sensors 4R and 4B for red color image pickup and blue color image pickup on the other provide spatial sampling at positions offset from each other by $\tau_s/2$. Thus, the sampled green color image pickup output signal $S_{G^*}$ produced by the CCD image sensor 4G and sampled at the sampling frequency fs on one hand and the sampled red color image pickup output signal $S_{R^*}$ and the sampled blue color image pickup output signal $S_{B^*}$ produced by the CCD image sensors 4R, 4B, and sampled at the sampling frequency fs on the other, are in antiphase relative to each other, as may be seen from the signal spectra of the three primary color image pickup output signals $S_{R^*}$, $S_{G^*}$ and $S_{B^*}$ in FIG. 3.

The image pickup output signals $S_{R^*}$, $S_{G^*}$ and $S_{B^*}$, read out from the CCD image sensors 4R, 4G and 4B by readout clocks of the sampling frequency 4 fsc, are transmitted to analog/digital (A/D) converters 6R, 6G and 6B via buffer amplifiers 5R, 5G and 5B, respectively.

Each of these A/D converters 6R, 6G and 6B is supplied, from a timing generator, not shown, with clocks having the clock rate equal to the sampling rate fs of the image pickup output signals $S_{R^*}$, $S_{G^*}$ and $S_{B^*}$, that is, the clock rate is equal to that of the readout clocks for the CCD image sensors 4R, 4G and 4B. The A/D converters 6R, 6G and 6B directly digitize the image pickup output signals $S_{R^*}$, $S_{G^*}$ and $S_{B^*}$ at the clock rate fs (equal to 4 fsc) to produce digital color signals $D_{R^*}$, $D_{G^*}$ and $D_{B^*}$ having output spectra which are the same as the spectra of the image pickup output signals $S_{R^*}$, $S_{G^*}$ and $S_{B^*}$ shown in FIG. 3A.

The digital color signals $D_{R^*}$, $D_{G^*}$ and $D_{B^*}$, produced by the A/D converters 6R, 6G and 6B, are transmitted to interpolating sections 7R, 7G and 7R, respectively.

These interpolating sections 7R, 7G and 7B interpolate the image pickup output signals $S_{R^*}$, $S_{G^*}$ and $S_{B^*}$, which exhibit the clock rate fs, to produce digital color signals $D_{R^{}}$, $D_{G^{}}$ and $D_{B^{**}}$ having a clock rate 2 fs (i.e. twice the clock rate fs).

That is, with the present color television camera apparatus, the three CCD image sensors 4R, 4G and 4B, operating under the principle of the spatial offsetting technique, the analog/digital (A/D) converters $6_{R^*}$, $6_{G^*}$ and $6_{B^*}$ digitize the image pickup output signals $S_{R^*}$, $S_{G^*}$ and $S_{B^*}$ (which were read out from the CCD image sensors 4R, 4G and 4B at the sampling rate fs) and the interpolating sections 7R, 7G and 7B interpolate the digital color signals $D_{R^*}$, $D_{G^*}$ and $D_{B^*}$ to form the digital color signals $D_{R^{}}$, $D_{G^{}}$ and $D_{B^{}}$ having the clock rate 2 fs (or twice the sampling rate fs). These digital color signals $D_{R^{}}$, $D_{G^{}}$ and $D_{B^{}}$ comprise three primary color digital output signals having the frequency distribution shown in FIG. 3B.

It will be noted that the three primary color image pickup output signals $S_{R^*}$, $S_{G^*}$ and $S_{B^*}$ from the CCD image sensors 4R, 4G and 4B cannot be put to direct arithmetic operation, since the green color image pickup signal $S_{G^*}$ is phase-offset by $\pi$ from both the red color image pickup output signal $S_{R^*}$ and the blue color image pickup output signal $S_{B^*}$, as described previously (and shown in FIG. 2). However, these primary color signals are interpolated at the interpolating sections 7R, 7G and 7B into phase-matched digital color signals $D_{R^{}}$, $D_{G^{}}$ and $D_{B^{**}}$ at the 2 fs rate which may be digitally processed.

Alternatively, the above-described image pickup signal generating means may be so implemented that, by using a solid-state image sensor with a number of pixels large enough to assure a high resolution without resorting to spatial offsetting at the image pickup section, the three primary color image pickup digital output signals may be generated at the 2 fs rate by the A/D converter without the necessity of performing the above-mentioned interpolating operation.

The digital color signals $D_{R^{}}$, $D_{G^{}}$ and $D_{B^{**}}$ produced by the interpolating sections 7R, 7G and 7B at the 2 fs rate are supplied to a matrix circuit 8.

The matrix circuit 8 performs a matrix operation on the digital color signals $D_{R^{}}$, $D_{G^{}}$ and $D_{B^{}}$ to generate a digital luminance signal $D_{Y^{}}$ at the 2 fs rate and digital color difference signals $D_{C1^*}$ and $D_{C2^*}$ both at the fs rate. The digital color signals $D_{R^{}}$, $D_{G^{}}$ and $D_{B^{**}}$ are subjected to downsampling in the matrix circuit by means of a pre-filter having a zero point at least at the frequency fs to produce the digital color difference signals $D_{C1^*}$ and $D_{C2^*}$ at the fs rate.

The digital luminance signal $D_{Y^{**}}$ at the 2 fs rate is supplied by the matrix circuit 8 to a summation circuit 14 by way of a delay circuit 9 whose output also is coupled to a signal output terminal 21. The matrix circuit supplies the digital color difference signals $D_{C1^*}$ and $D_{C2^*}$ at the fs rate to a modulator 12 by way of low-pass filters 10 and 11.

The modulator 12 performs a modulating operation in which the color subcarrier is subjected to orthogonal biaxial modulation by the digital color difference signals $D_{C1^*}$ and $C_{C2^*}$ having the signal spectrum shown in FIG. 3D.

Figure 4:
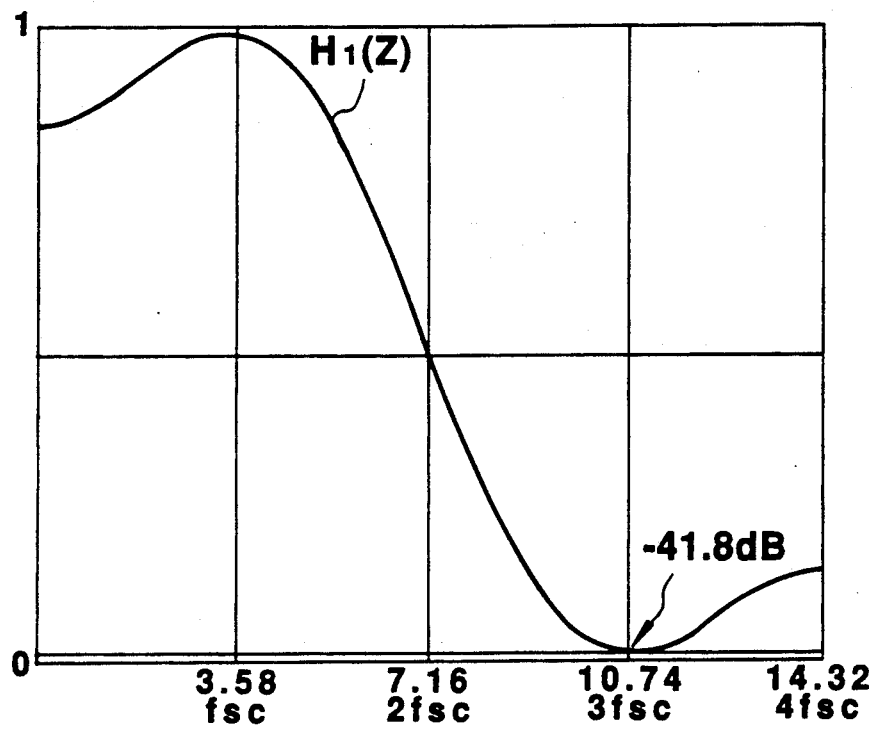
FIG. 4 is a graphical representation of the frequency characteristics of an interpolating digital filter used in the color television camera shown in FIG. 1.
Figure 5:
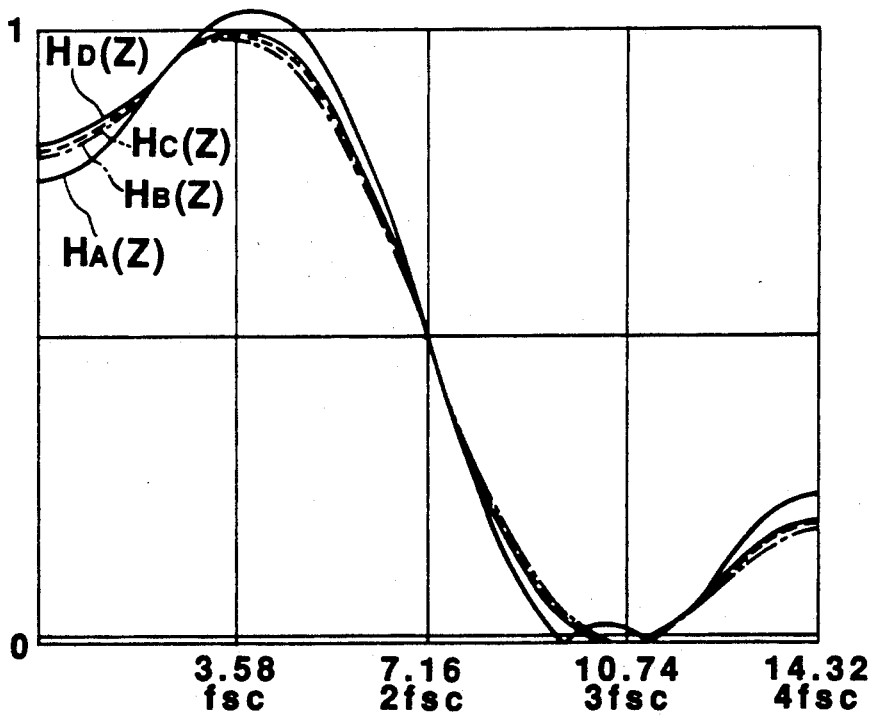
FIG. 5 are graphical representations of the other frequency characteristics of the interpolating digital filter used in the color television camera shown in FIG. 1.

The modulated color difference signals MOD.C* produced by the modulating circuit 12 at the fs rate are modulated color signals exhibiting a frequency distribution containing odd harmonics of the color subcarrier frequency fsc as shown in FIG. 3E. The modulated color difference signals MOD.C* are supplied by Way of a rate converting circuit 13 to the summation circuit 14 and to a signal output terminal 22. 18 It will be noted that the modulated color difference signals MOD.C* at the fs rate, produced by the modulator 12, contain odd harmonics of the color subcarrier frequency fsc, as described previously, so that, if the signals MOD.C* remain as they are, the 3fs frequency component thereof will affect the composite video signals. To avoid this, the rate converting circuit 13 processes the modulated color difference signal MOD.C* by digital filtering with the filtering characteristics shown in FIG. 3F to extract the fsc and 2 fsc frequency components and for generating the modulated color difference signal MOD.C* having the rate 2 fs corresponding to the frequency 8fsc and the frequency distribution shown in FIG. 3G. The rate converting circuit 13 is comprised of a digital filter exhibiting filter characteristics which allow the passage of the color subcarrier frequency fsc and inhibit the passage of the frequency component fs-fsc. The digital filter employed in the rate converting circuit 13 need only exhibit filter characteristics such that the differential coefficient becomes zero at the frequency fsc and at least one zero point exists in the vicinity of the frequency fs-fsc. In the case of the NTSC system color television camera, as in the present embodiment, the transfer function $H_1(z)$ of that filter may be expressed as:

$$H_1(z) = \frac{1}{23}(-4_z^{-6} + 12_z^{-4} + 12_z^{-3} + 12_z^{-2} - 4) \quad (1)$$

which is graphically depicted in FIG. 4. Alternatively, the digital filter may exhibit the transfer functions $H_{A(Z)}$, $H_{B(Z)}$, $H_{C(Z)}$ or $H_{D(Z)}$ expressed as:

$$H_A(z) = \frac{1}{4}(-z^{-6} + 2_z^{-4} + 4_z^{-3} + 2_z^{-2} - 1) \quad (2)$$

$$H_B(z) = \frac{1}{16}(-3_z^{-6} + 8_z^{-4} + 16_z^{-3} + 8_z^{-2} - 3) \quad (3)$$

$$H_C(z) = \frac{1}{10}(-2_z^{-6} + 5_z^{-4} + 10_z^{-3} + 5_z^{-2} - 2) \quad (4)$$

$$H_D(z) = \frac{1}{24}(-5_z^{-6} + 12_z^{-4} + 4_z^{-3} + 12_z^{-2} - 5) \quad (5)$$

which are graphically depicted in FIG. 5.

The summation circuit 14 sums the modulated color difference signals MOD.C at the 2 fs rate produced by the rate converting circuit 13 with the digital luminance signal $D_{Y^{}}$ at the 2 fs rate supplied thereto by the matrix circuit 8 by way of the delay circuit 9 to produce digital composite video signals $D_{CS^{}}$ at the 2 fs rate having the frequency distribution shown in FIG. 3H. These digital composite video signals $D_{CS^{}}$ are supplied to the digital/analog (D/A) converter 15.

The delay circuit 9 imparts to the digital luminance signal $D_{Y^{}}$ a delay corresponding to the processing time necessary for the modulator 12 and rate converting circuit 13 to produce modulated color difference signal MOD.C from the digital difference signals $D_{C1^*}$ and $D_{C2^*}$ supplied by the matrix circuit 8.

The digital composite video signals $D_{CS^{**}}$ at the 2 fs rate are converted by the D/A converter 15 into corresponding analog composite signals of the NTSC system, which are then supplied as analog composite video signals CS at signal output terminal 23 by Way of a post filter 16 having the low-pass filter characteristics shown in FIG. 3I to pass the frequency components up to approximately 4 fsc, that is, to pass frequency components lower than fs.

Since the analog composite video signals CS have been converted from the digital composite video signals $D_{CS^{**}}$ having the 2 fs rate, the bandwidth of the luminance signal Y is expanded to the frequency 4 fsc, or fs, as shown in FIG. 3J, to provide an image of high resolution.

On the other hand, the modulated color difference signal MOD.C at the 2 fsc rate generated by the rate converting circuit 13, has been formed by interpolation by using a digital filter with filter characteristics which allow the passage of the color subcarrier frequency fsc component and inhibit the passage of the fs-fc frequency component. Consequently, as shown in FIG. 3G, the modulated color difference signal MOD.C does not include the 3 fsc frequency component. Thus, the analog composite video signal CS, formed by converting into analog form the digital composite video signal $D_{CS^{}}$ at the 2 fs rate, which had been obtained by summing the modulated color difference signal MOD.C and the digital luminance signal $D_{Y^{**}}$, both at the 2 fs rate, is free from harmonic distortion of the color subcarrier.

In the above-described embodiment in which the present invention is applied to a color television camera of the NTSC system, the digital composite video signal $D_{CS^{}}$ at the 2 fs rate is formed by digital processing at the clock rate 2 fs which corresponds to 8fsc, and the resultant digital composite video signal $D_{CS^{}}$ is converted into analog form to generate the analog composite video signal CS from which an image of higher resolution that is free from harmonic distortion of the color subcarrier is produced. However, in the color television camera of the present invention, the sampling frequency fs need not necessarily be a frequency which is an integer multiple of the color subcarrier frequency fsc. Thus, the present invention may also be applied to a color television camera of the PAL system as represented by the signal spectrum diagrams of FIG. 6 which are quite similar to the signal spectrum diagrams of FIG. 3 that have been described above to explain the operation of the color television apparatus of the NTSC system.

That is, in the color television camera apparatus of the PAL system, the signal spectrum of the image pickup output signals $S_{R^*}$, $S_{G^*}$ and $S_{B^*}$, read out at the readout clocks of the sampling frequency fs from the CCD image sensors operating under the principle of spatial offsetting, is as shown in FIG. 6A.

In the present PAL system color television camera apparatus, the sampling frequency fs is set equal to, for example, 908 or 944 times the horizontal scanning frequency $f_H$ instead of four times the color subcarrier frequency fsc.

The image pickup output signals $S_{R^*}$, $S_{G^*}$ and $S_{B^*}$ in FIG. 1 are digitized at the sampling frequency fs and, by digital interpolation, are converted into digital color signals $D_{R^{}}$, $D_{G^{}}$ and $D_{B^{**}}$ at the 2 fs rate having the signal spectrum shown in FIG. 6B.

The digital color signals $D_{R^{}}$, $D_{G^{}}$ and $D_{B^{}}$ are used by matrix circuit 8 to produce digital luminance signals $D_{Y^{}}$ at the 2 fs rate and digital color difference signals $D_{C1^*}$ and $D_{C2^*}$ at the fs rate, as shown in FIG. 6C.

The digital color difference signals $D_{C1^*}$ and $D_{C2^*}$ are filtered by a chroma filter to limit their frequency components as shown in FIG. 6D, and the color subcarrier is modulated by PAL system modulating means in accordance with orthogonal biaxial modulation to produce the modulated color difference signals MOD.C* at the fs rate having the signal spectrum shown in FIG. 6E.

The modulated color difference signal MOD.C* is converted, by digital interpolation in a digital filter having filter characteristics which inhibit the fs-fsc frequency component as shown in FIG. 6F, into a modulated color difference signal MOD.C** at the 2 fs rate having the signal spectrum as shown in FIG. 6G.

This modulated color difference signal MOD.C and the aforementioned digital luminance signal $D_{Y^{}}$ are summed to produce a digital composite video signal $D_{CS^{**}}$ at the 2 fs rate having the signal spectrum shown in FIG. 6H.

The digital composite video signal $D_{CS^{**}}$ is converted by digital/analog converting means into a corresponding analog signal, which is then passed through a post filter having low-pass filter characteristics to pass frequency components lower than fs as shown in FIG. 6I to produce a high resolution analog composite video signal CS of the PAL system which is free from aliasing components and in which the bandwidth of the luminance signal Y has been extended up to fs, as shown in FIG. 6J.

Figure 7:
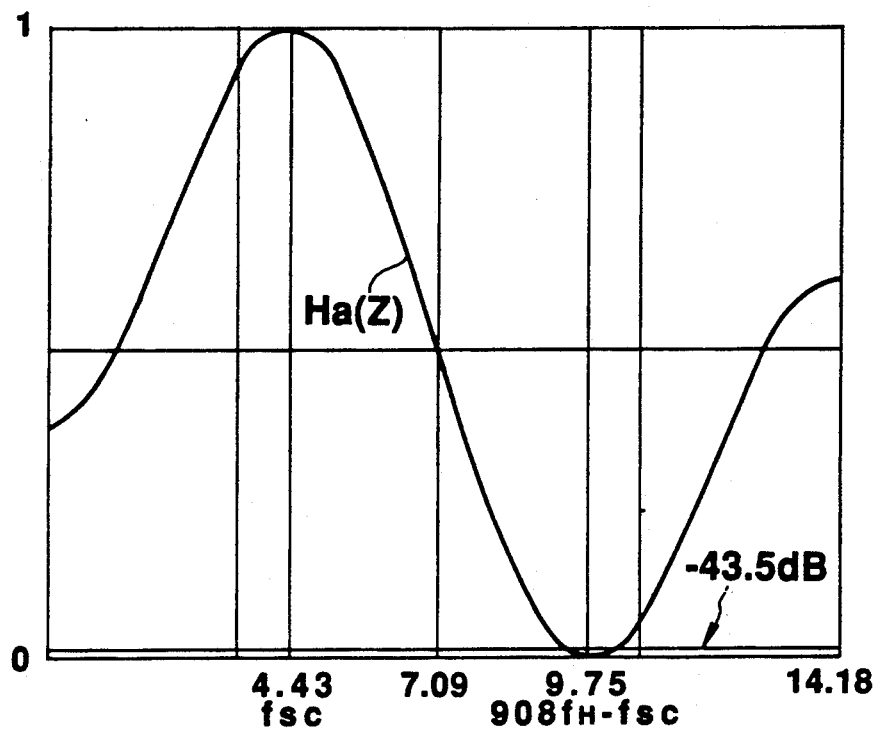
FIG. 7 is a graphical representation of the frequency characteristics of an interpolating digital filter used in the color television camera of the PAL system to which the present invention may be applied.

When the digital filter is used in a PAL system color television camera for interpolation as a rate converting means to convert the modulated color difference signals MOD.C* at the fs rate into the modulated color difference signal MOD.C** at the 2 fs rate, with fs=908$f_H$, for example, the filter exhibits the filter characteristics shown in FIG. 7 by the transfer function Ha(z) as follows:

$$H_a(z) = \frac{1}{8}(-3_z^{-6} + 2_z^{-4} + 8_z^{-3} + 2_z^{-2} - 3) \quad (6)$$

Figure 8:
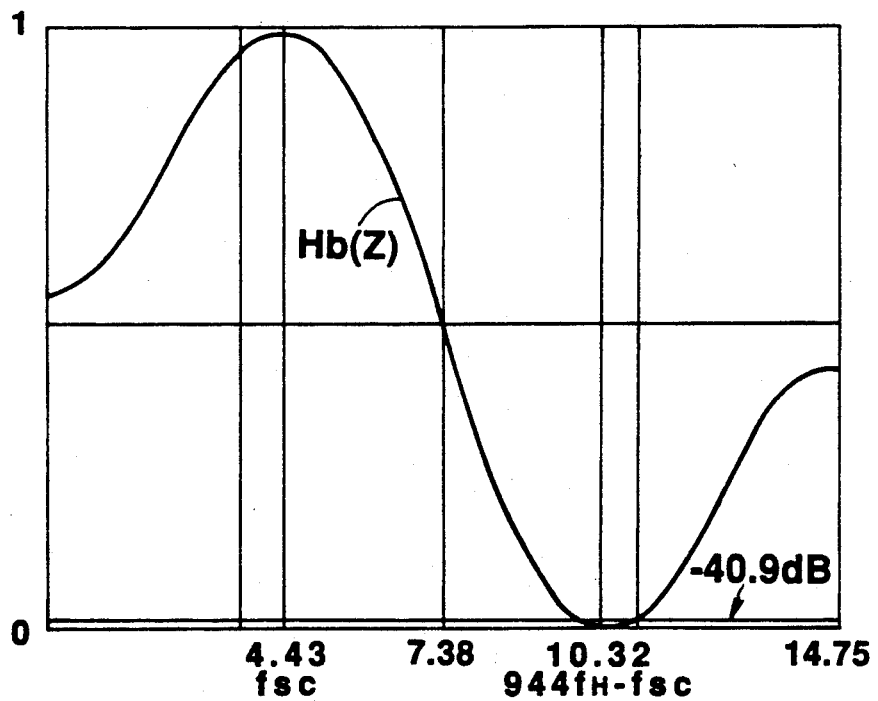
FIG. 8 is a graphical representation of other frequency characteristics of the interpolating digital filter used in the color television camera of the PAL system to which the present invention may be applied.

Alternatively, if fs=944$f_H$, the digital filter exhibits the filter characteristics shown in FIG. 8 which may be expressed by the transfer function Hb(z):

$$H_b(z) = \frac{1}{20}(-6_z^{-6} + 7_z^{-4} + 20_z^{-3} + 7_z^{-2} - 6) \quad (7)$$

In the above-described color television camera apparatus, image pickup signal generating means generate the three digital primary color image pickup signals at the 2 fs rate, which are then transmitted to luminance signal generated means and color difference signal generating means (such as matrix 8), whereby the digital luminance signal and the digital color difference signals may be formed.

The image pickup signal generating means in this embodiment are formed by image pickup sections in which the solid-state image sensor for the green color image pickup on the one hand and the solid-state image sensors for the red color image pickup and for the blue color image pickup on the other are arrayed relative to each other with a spatial offset equal to one-half the pitch of the pixel repetition rate to improve the resolution by reason of the above-mentioned spatial offsetting technique. The three primary color image pickup signals, read out at the sampling rate fs from the solid-state image sensors, are digitized by analog/digital converting means at the clock rate equal to the sampling rate fs to generate the three primary color digital image pickup output signals, which are then converted by rate conversion and interpolation into three primary color digital image pickup output signals at the 2 fs rate to produce three phase-matched color digital image pickup output signals.

The broad band digital luminance signal is formed from the three color digital image pickup signals having the 2 fs rate by the luminance signal forming means. The resultant luminance signal is at a rate equal to 2 fs.

The color difference signal generating means processes the three primary color digital image pickup signals produced by the image pickup signal generating means at the 2 fs rate by down-sampling those signals to the rate fs using a pre-filter having a zero point at least at the frequency fs to produce the digital color difference signals at the fs rate.

The modulated color signal is produced by the modulating means at the fs rate from the digital color difference signals supplied from the color difference signal generating means at the fs rate. This modulated color signal is converted by rate converting means into the modulated color difference signal at the 2 fs rate which is supplied to the composite video signal generating means, where the digital composite video signal at the 2 fs rate is formed from the digital luminance signal and the modulated color difference signal, both at the 2 fs rate.

The rate converting means preferably comprises a digital filter having filter characteristics to pass the color subcarrier frequency fsc component and to inhibit the fs-fsc frequency component. One such digital filter exhibits filter characteristics wherein the differential coefficient is approximately zero at the color subcarrier frequency fsc and at least one zero point exists in the vicinity of the frequency fs-fsc, thereby obviating adverse effects in the composite video signal by high harmonics of the color subcarrier.

Thus, with the color television camera apparatus according to the present invention, the digital composite video signal is formed from the digital luminance signal and the modulated color difference signal (both at the 2 fs rate) by composite video signal forming means and the resultant digital composite video signal at the 2 fs rate is converted into analog form by digital-/analog converting means to produce the analog composite video signal capable of providing a high resolution image which is substantially free of harmonic distortion due to the color subcarrier and in which the bandwidth of the luminance signal is enlarged to fs.

Figure 9:
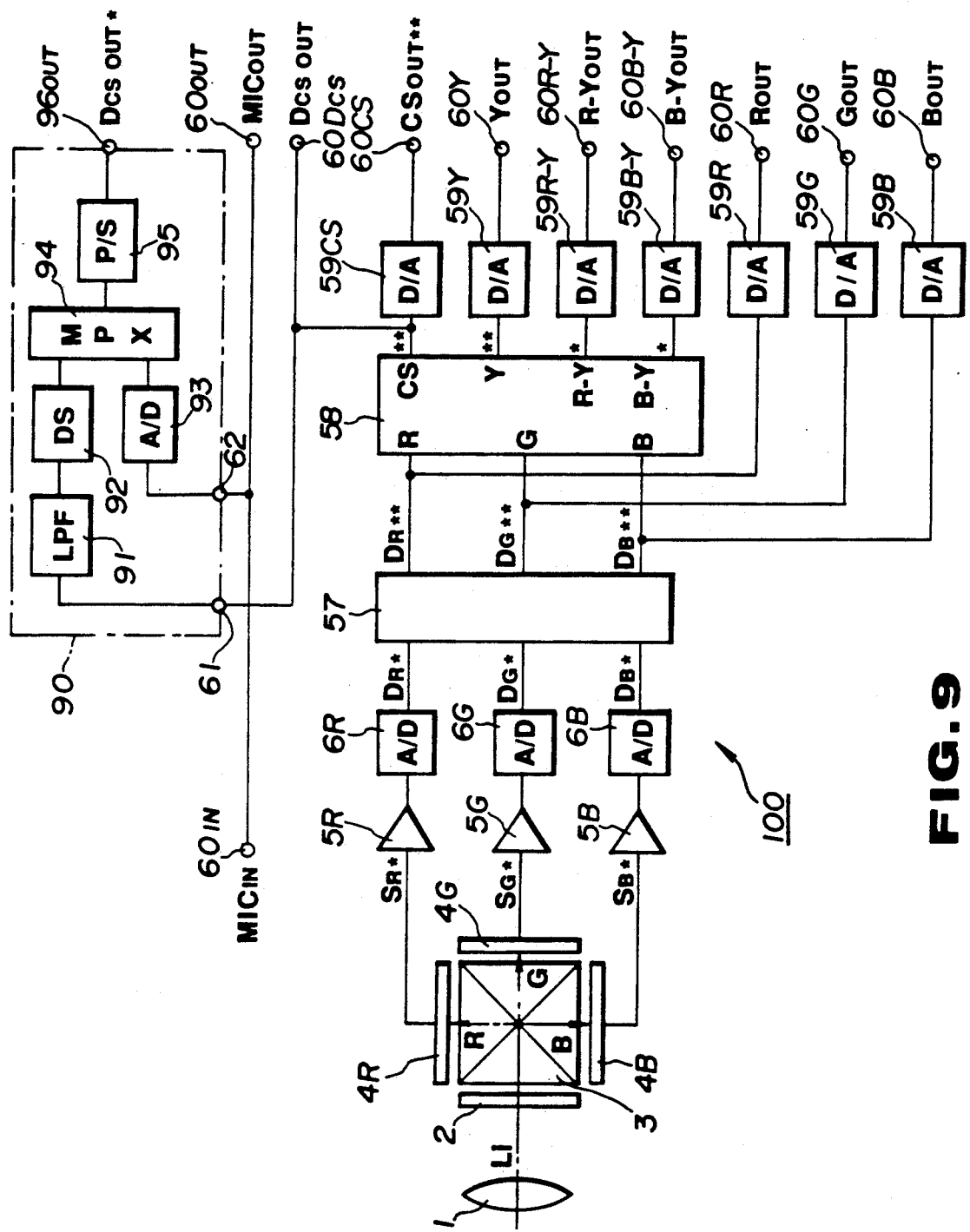
FIG. 9 is a block diagram showing a modified embodiment of the color television camera of the present invention.

Referring now to FIG. 9, a modified embodiment of the color television camera of the present invention in which video signals of various types may be outputted, will be explained.

Digital color signals $D_{R^*}$, $D_{G^*}$ and $D_{B^*}$, produced by the A/D converters 6R, 6G and 6B are supplied, as in the embodiment shown in FIG. 1, to a signal processing section 57.

Figure 10:
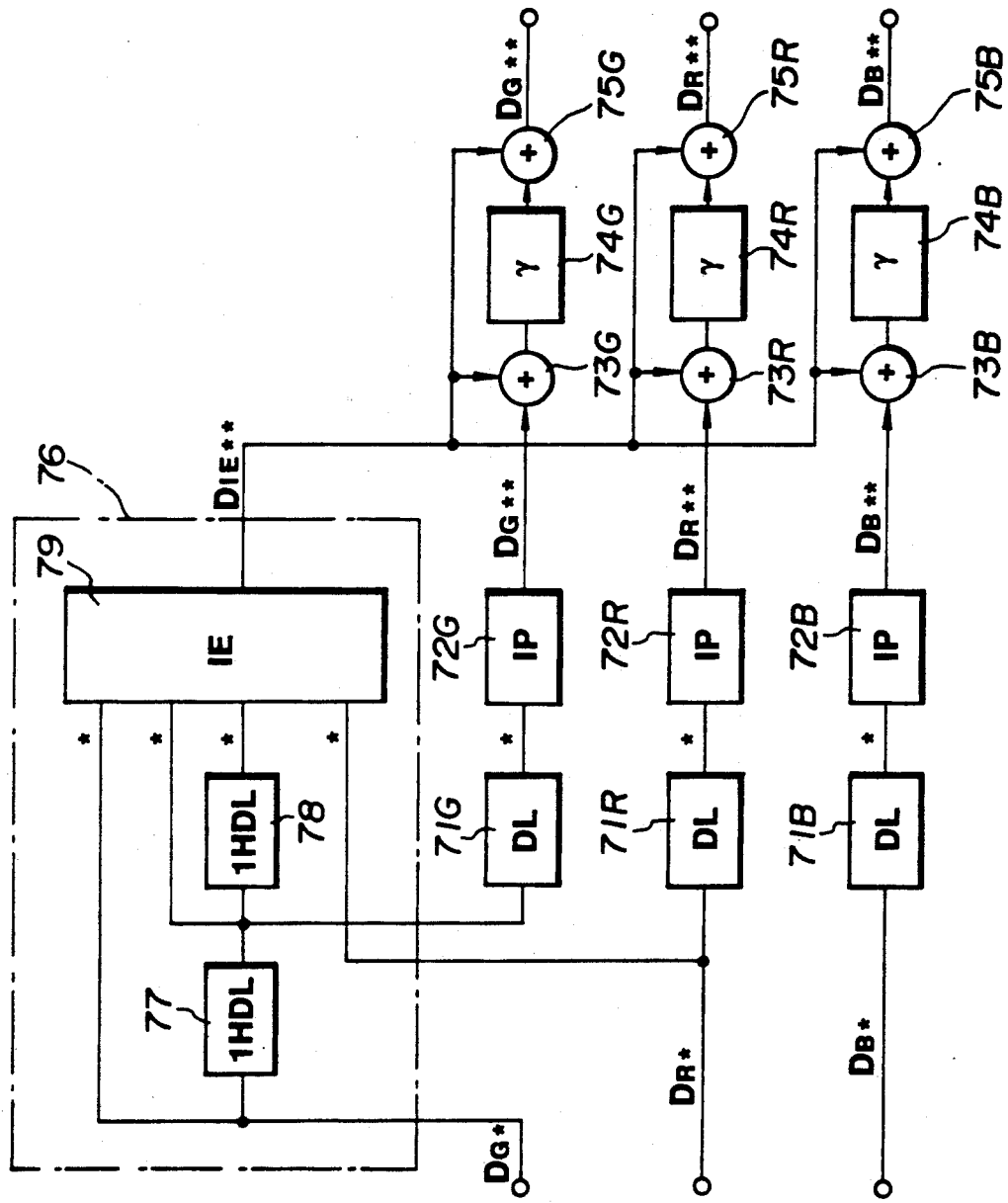
FIG. 10 is a block diagram of a signal processor of the color television camera shown in FIG. 9.

FIG. 10 shows one example of the signal processing section 57, which is comprised of interpolating sections 72R, 72G and 72B, to which the digital color signals $D_{R^*}$, $D_{G^*}$ and $D_{B^*}$ from the A/D converters 6R, 6G and 6B are supplied by way of delay circuits 71R, 71G and 71B. The signal processing section also includes first summation circuits 73R, 73G and 73B; to which interpolated digital color signals $D_{R^{}}$, $D_{G^{}}$ and $D_{B^{**}}$ are supplied from the interpolating sections 72R, 72G and 72B, gamma compensating circuits 74R, 74G and 74B coupled to the outputs of the first summation circuits 73R, 73G and 73B, second summation circuits 75R, 75G and 75B, to which gamma compensated color data are supplied from the gamma compensation circuits 74R, 74G and 74B and an image enhancement section 76, to which digital color signals $D_{R^*}$ and $D_{G^*}$ are supplied.

The image enhancement section 76 is formed of a series connection of first and second 1H delay circuits 77 and 78 and an image enhancement data forming circuit 79. The green digital signal $D_{G^*}$ from the A/D converter 6G is supplied to the image enhancement data forming circuit 79 directly and also by way of the 1H delay circuit 77 and by way of the first and second 1H delay circuits 77 and 78. The red digital signal $D_{R^*}$ from the A/D converter 6R also is directly supplied to the image enhancement data forming circuit 79. The image enhancement data forming circuit 79 uses the green and red digital signals supplied from the A/D converters 6R and 6G at the fs (or 4 fsc) rate to produce image enhancement data $D_{IE^{**}}$ at the 2 fs rate (or 8fsc).

The image enhancement data forming circuit 76 transmits the image enhancement data $D_{IE^{**}}$ at the 2 fs rate or 8fsc, to the 16 first summation circuits 73R, 73G and 73B and to the second summation circuits 75R, 75G and 75B.

The interpolating sections 72R, 72G and 72B interpolate the digital color signals $D_{R^*}$, $D_{G^*}$ and $D_{B^*}$, which are produced at the fs rate (or 4 fsc) by A/D converters 6R, 6G and 6B to form digital color signals $D_{R^{}}$, $D_{G^{}}$ and $D_{B^{}}$ at the 2 fs rate (or 8fsc). The interpolating sections 72R, 72G and 72B supply the digital color signals $D_{R^{}}$, $D_{G^{}}$ and $D_{B^{}}$ at the 2 fs rate to the first summation circuits 73R, 73G and 73B.

The first summation circuits 73R, 73G and 73B operate to sum the image enhancement data $D_{IE^{}}$ with the digital color signals $D_{R^{}}$, $D_{G^{}}$ and $D_{B^{}}$ to perform an image enhancement. The first summation circuits 73R, 73G and 73B supply the image enhanced digital color signals $D_{R^{}}$, $D_{G^{}}$ and $D_{B^{**}}$ to the gamma correction circuits 74R, 74G and 74B.

The gamma correction circuits 74R, 74G and 74B perform gamma correction on the image enhanced digital color signals $D_{R^{}}$, $D_{G^{}}$ and $D_{B^{}}$ supplied form the first summation circuits 73R, 73G and 73B and apply the gamma corrected digital color signals $D_{R^{}}$, $D_{G^{}}$ and $D_{B^{}}$ to the second summation circuit 75R, 75G and 75B.

The second summation circuits 75R, 75G and 75B operate to sum the image enhanced data $D_{IE^{}}$ at the 2 fs rate with the gamma corrected digital color signals $D_{R^{}}$, $D_{G^{}}$ and $D_{B^{}}$ also at the 2 fs rate to perform further image enhancement.

The signal processing section 57 thus produces gamma corrected and image enhanced digital color signals $D_{R^{}}$, $D_{G^{}}$ and $D_{B^{}}$ at the 2 fs rate. These digital color signals $D_{R^{}}$, $D_{G^{}}$ and $D_{B^{}}$ are supplied to a color encoder 58 and to digital/analog converters 59R, 59G and 59B.

The D/A converters 59R, 59G and 59B operate to convert the high resolution digital color signals $D_{R^{}}$, $D_{G^{}}$ and $D_{B^{**}}$ at the 2 fs rate into analog form to produce three primary color image pickup output signals $R_{OUT}$, $G_{OUT}$ and $B_{OUT}$ at signal output terminals 60R, 60G and 60B.

Figure 11:
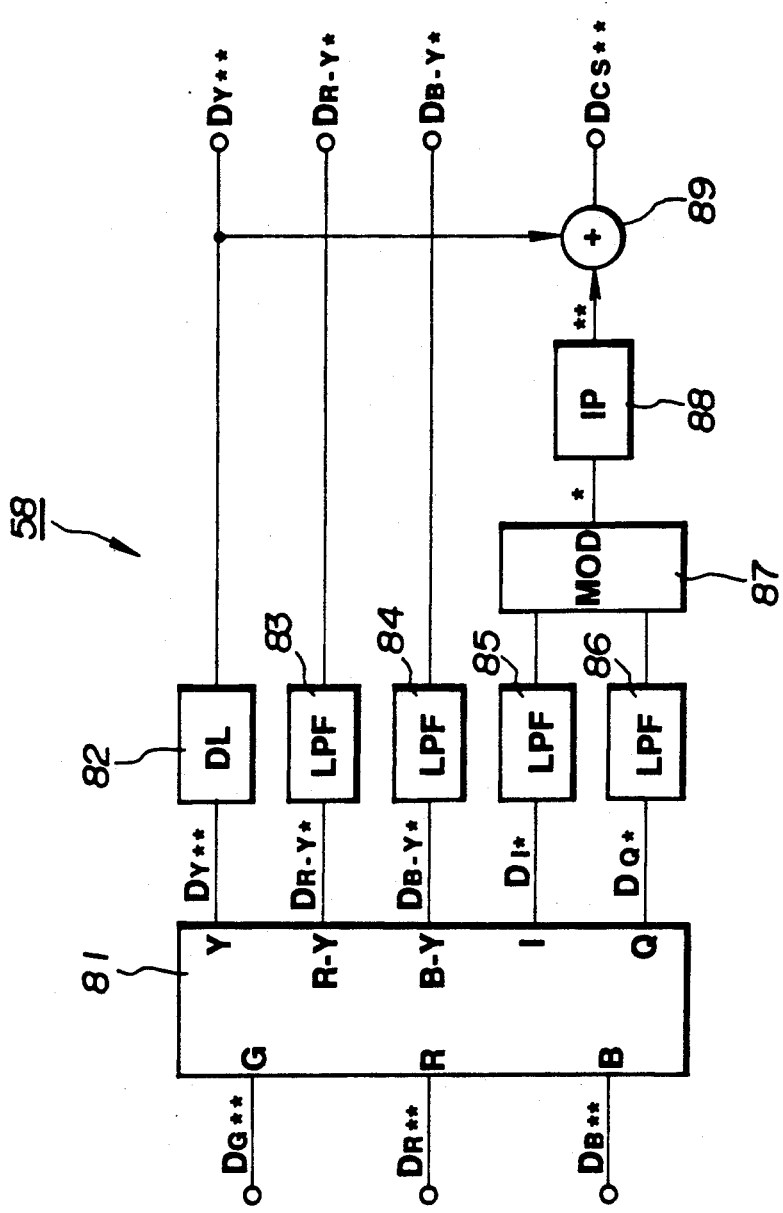
FIG. 11 is a block diagram of a color encoder of the color television camera shown in FIG. 9.

FIG. 11 shows one example of the color encoder 58 which is comprised of a matrix circuit 81 to which the digital color signals $D_{R^{}}$, $D_{G^{}}$ and $D_{B^{}}$ are supplied at the 2 fs rate from the signal processing section 57, a delay circuit 82 to which digital luminance signals $D_{Y^{}}$ are supplied from the matrix circuit 81, low-pass filters 83, 84, 85 and 86 to which digital color difference signals $D_{R-Y^*}$, $D_{B-Y^*}$, $D_{I^*}$ and $D_{G^*}$ are supplied from the matrix circuit 81, a modulation circuit 87 to which the signals $D_{I^*}$ and $D_{Q^*}$ are supplied from the matrix circuit 81 by way of the low-pass filters 85 and 86, an interpolating circuit 88 to which modulated output data is supplied from the modulating circuit 87, and a summation circuit 89 to which interpolated output data from the interpolating circuit 88 and the digital luminance signal $D_{Y^{**}}$ from the matrix circuit 81 are supplied, the latter by way of the delay circuit 82.

The matrix circuit 81 performs a matrix operation on the digital color signals $D_{R^{}}$, $D_{G^{}}$ and $D_{B^{}}$ to produce the digital luminance signal $D_{Y^{}}$ at the 2 fs rate and also the digital color difference signals $D_{R-Y^*}$, $D_{B-Y^*}$, $D_{I^*}$ and $D_{Q^*}$ at the fs rate. The digital luminance signal $D_{Y^{}}$, generated in the matrix circuit 81, corresponds to luminance signal $Y^{}$ having the frequency distribution shown in FIG. 12B. The signal spectra of the three-color image pickup output signals supplied by the CCD image sensors 4R, 4G and 4B, are shown in FIG. 12A. The matrix circuit 81 of color encoder 58 responds to the component color image data, formed of digital color signals $D_{R^{}}$, $D_{G^{}}$ and $D_{B^{**}}$ to produce the digital luminance signal $D_{Y^*}$, which is supplied as an output by way of delay circuit 82, while producing the digital color difference signals $D_{R-Y^*}$ and $D_{B-Y^*}$, which are supplied as outputs by way of low-pass filters 83 and 84. The delay circuit provides delay characteristics matching the delay of the low-pass filters 83 and 84.

In the modulating circuit 87 of the color encoder 58, the digital signals $D_{I^*}$ and $D_{Q^*}$, supplied from the matrix circuit 81 by way of the low-pass filters 85 and 86, are modulated in accordance with rectangular biphase modulation. The modulated output data from the modulating circuit 87 has a frequency distribution similar to that of the modulated color difference signal MOD.C* of FIG. 3E and contains odd harmonics of the color subcarrier frequency fsc as shown in FIG. 12C.

The interpolating circuit 88 performs digital filtering on the modulated output data from the modulating circuit 87 for extracting therefrom the fsc component and the 7fsc component by using the filtering characteristics shown in FIG. 12D to produce modulated color difference data having the frequency distribution shown in FIG. 12E.

The color encoder 58 operates to sum the digital luminance signal $D_{Y^{}}$, supplied from the matrix circuit 81 by way of the delay circuit 82, with the modulated color difference signal data produced at the 2 fs rate by the interpolating circuit 88, in summing circuit 89, to produce a digital composite video signal $D_{CS^{}}$ having the frequency distribution shown in FIG. 12F.

Thus, the color encoder 58, which receives the gamma corrected and image enhanced digital color signals $D_{R^{}}$, $D_{G^{}}$ and $D_{B^{}}$ at the 2 fs rate from the signal processing section 57, produces digital component color video data comprised of the high resolution digital luminance signal $D_{Y^{}}$ at the 2 fs rate and the digital color difference signals $D_{R-Y^*}$ and $D_{B-Y^*}$ at the fs rate, while also producing the high resolution digital composite video signals $D_{CS^{**}}$ at the 2 fs rate.

The output component color video data from the color encoder 58, that is the digital luminance signal $D_{Y^{**}}$ and the digital color difference signals $D_{R-Y^*}$ and $D_{B-Y^*}$, are supplied to digital/analog (D/A) converters 59Y, 59R-Y and 59B-Y.

The D/A converters 59Y, 59R-Y and 59B-Y operate to convert the digital luminance signal DY* and the digital chrominance signal data $D_{R-Y^*}$ and $D_{B-Y^*}$ into analog form to produce the resulting analog component color video signals $Y_{OUT}$, R-$Y_{OUT}$ and B-$Y_{OUT}$ at signal output terminals 60Y, 60R-Y and 60B-Y.

The digital composite video signals $D_{CS}$ supplied from the color encoder 58, are supplied to digital-/analog (D/A) converter 59CS and also to signal output terminal 60$D_{CS}$ and to a first adapter connection terminal 61.

The D/A converter 59CS operates to convert high resolution digital composite video signals $D_{CS}$ at the 2fs rate into analog form to produce the resulting analog composite video signal $CS_{OUT}$ at signal output terminal 60CS.

The color television camera of the present embodiment also has an input terminal 60$_{IN}$ and an output terminal 60$_{OUT}$, both connected to a signal line for voice signals obtained at a microphone, not shown. A second adapter connection terminal 62 also is connected to this voice line.

The present color television camera apparatus also includes a camera adapter 90 which is detachably connectable to a main camera body 100 and is adapted to receive the aforementioned digital composite video signals $D_{CSOUT^{**}}$ having the 2fs rate at signal output terminal 60$D_{CS}$.

The camera adapter 90 is comprised of a digital low-pass filter 91, supplied with the digital composite video signals $D_{CSOUT^{}}$ at the 2fs rate by way of the first adapter connection terminal 61, a rate converting circuit 92, supplied with the digital composite video signals $D_{CSOUT^{}}$ by way of this digital low-pass filter 91, an analog/digital (A/D) converter 93, supplied with microphone input voice signals from the camera by way of the second adapter connection terminal 62, a multiplexer circuit 94, adapted to select converted output data from the rate converting circuit 92 or converted voice data from the A/D converter 93, and a parallel/-serial (P/S) converter 95 adapted to convert the output data from the multiplexer circuit 94 into serial data.

The digital low-pass filter 91 has filter characteristics in which the pass band of the digital composite video signals $D_{CSOUT^{}}$ at the 2fs rate supplied thereto from color encoder 58 by way of the first adapter connection terminal 61, is limited to about less than 2fsc, as shown in FIG. 12G. The rate converting circuit 92 processes the filter output by limiting the bandwidth of the digital composite video signal $D_{CSOUT^{}}$ supplied from filter 91 to not more than about fs/2 by downsampling, thereby to produce converted digital composite video signals $D_{CSOUT^*}$ at the fs rate, shown in FIG. 12I.

The A/D converter 93 operates to digitize the microphone input voice signals, supplied from the microphone of the camera via second adapter connection terminal 52, thus generating digital voice signal data.

The multiplexer circuit 94 operates to switch between the converted output data from the rate converting circuit 92, that is the digital composite video signal $D_{CSOUT^*}$ at the fs rate, and the converted output data from the A/D converter 93, that is the digital voice signal data, with predetermined timing, for adding the digital voice signal data to the digital composite video signal $D_{SCOUT^*}$. The digital composite video signals $D_{CSOUT^*}$, to which the digital voice signal data has been added by the multiplexer circuit 94, are supplied to the P/S converter 95 and thereby converted into serial data which then are provided at data output terminal 96$_{OUT}$.

In the present color television camera, the three color image pickup output signals $S_{R^*}$, $S_{G^*}$ and $S_{B^*}$, read out at the sampling rate fs from the three CCD image sensors 4R, 4G and 4B operating in accordance with the spatial offsetting technique, are digitized at the A/D converters 6R, 6G and 6B at a clock rate equal to the sampling rate fs to produce the digital color signals $D_{R^*}$, $D_{G^*}$ and $D_{B^*}$, which are subjected to image enhancement and gamma correction operations in the signal processor 57 operating at the clock rate 2fs. The resulting digital composite video signals $D_{CSOUT^{**}}$ at the 2fs rate, produced by the color encoder 58, are converted by the D/A converter 59CS into corresponding analog signals. In this manner, high quality analog composite video signals $CS_{OUT}$ having excellent MTF characteristics and containing only a minor amount of aliasing components are produced at the signal output terminal 60CS of the camera.

On the other hand in the camera adapter 90 which is detachably connected to the camera, the pass band of the digital composite video signals $D_{CSOUT^{**}}$ at the 2fs rate, obtained from the camera, is limited by the digital low-pass filter 91 to about less than fs/2, and the resulting signals are converted by the rate converting circuit 92 into the digital composite video signals $D_{CSOUT^*}$ at the fs rate. In this manner, high quality digital composite video signals $D_{CSOUT^*}$ having excellent MTF characteristics and containing only a minor amount of aliasing components are produced at the data output terminal $96_{OUT}$.

It is noted that, although the digital low pass filter 91 and the rate converting circuit 92, by means of which the digital composite video signals $D_{CSOUT^{**}}$ generated at the 2fs rate by camera 100 are converted into digital composite video signals $D_{CSOUT^*}$ at the fs rate, are arranged as the camera adapter 90 and detachably connected to the camera, the functional block of this camera adapter 90 may alternatively be mounted permanently in the camera. Also the clock rate fs for A/D conversion may be set to any other frequency and need not be set to a frequency which is four times the color subcarrier frequency fsc.

In the above-described signal processing circuit of the solid-state image pickup apparatus and the color television camera of the present invention, an image output signal with an extremely high picture quality may be produced in which, with the solid-state imaging sensor having the discrete pixel structure with spatial offsetting and performing spatial sampling of the object image as the sub-Nyquist system, the MTF in the frequency range of 0 to fs/2 is improved and aliasing components in the frequency range of 0 to fs/2 are reduced. The digital composite video signals at the 2fs rate can be produced by the digital color encoder.

The pas band of the digital composite video signals at the 2fs rate from the color encoder in FIG. 9 is limited by the digital low pass filter to about less than fs/2, and the resulting signals are converted by the rate converting circuit into digital composite video signals at the fs rate to produce high-quality digital composite video signals having excellent MTF characteristics and containing only a minor amount of the aliasing components.

In the signal processing circuit of the solid-state image pickup apparatus of the present invention, the digital/analog converting means are provided for converting the digital composite video signals at the 2fs rate from the color encoder into an analog form to produce the analog composite video signals having excellent MTF characteristics and containing only a minor amount of aliasing components.

What is claimed is:

1. A color television camera having image pickup means providing three primary color image pickup signals at a predetermined rate fs, said color television camera comprising:
    analog/digital converting means for digitizing the color image pickup signals from said image pickup means at a clock rate equal to said rate fs,
    first rate converting means for converting digitized color image signals from said analog/digital converting means into primary color digital signals having a rate equal to 2fs,
    signal processing means supplied with the color digital signals from said first rate converting means for producing digital composite video signals at the 2fs rate from said color digital signals,
    digital low-pass filter means supplied with said digital composite video signals from said signal processing means for limiting the pass band of said composite video signals to about less than fs/2, and
    second rate converting means coupled to said digital low pass filter means for converting the rate of the pass band limited digital composite video signals to fs.

2. The color television camera according to claim 1 wherein said image pickup means comprises a first solid-state image pickup element for imaging a green image, a second solid-state image pickup element for imaging a red image and a third solid-state image pickup element for imaging a blue image, wherein said first solid-state image pickup element is offset from said second and third solid-state image pickup elements by one half of a repetitive pixel pitch.

3. The color television camera according to claim 1 further comprising digital/analog converter means supplied with said digital composite video signal from said signal processing means for converting the digital composite video signal at the 2fs rate into analog form to produce an output analog composite video signal.

4. The color television camera according to claim 1 further comprising image enhancement means supplied with digitized color image signals from said first analog/digital converting means and with primary color digital signals from said first rate converting means for image enhancing said primary color digital signals.

5. The color television camera according to claim 1 further comprising gamma correcting means supplied with the primary color digital signals from said first rate converting means for gamma correcting the primary color digital signals.

6. The color television camera according to claim 1 further comprising digital/analog converting means coupled to said first rate converting means for converting the primary color digital signals at the 2fs rate into analog signals.

7. The color television camera according to claim 1 wherein said signal processing means includes means for generating digital color difference signals at the fs rate from said primary color digital signals.

8. The color television camera according to claim 7 further comprising digital/analog converting means for converting the digital color difference signals into analog signals.

9. The color television camera according to claim 1 further comprising a microphone for providing voice signals, second analog/digital converting means for converting the voice signals from said microphone into digital voice signals, and multiplexer means supplied with the pass band limited digital composite video signals from said second rate converting means and with said digital video signals for selecting one of the signals supplied thereto.

10. A color television camera having image pickup means for providing three primary color image pickup signals at a predetermined rate fs, said color television camera comprising a camera portion including analog/-digital converting means for digitizing the color image pickup signals from said image pickup means at a clock rate equal to said rate fs, first rate converting means for converting the digitized color image signals from said analog/digital converting means into three primary color digital image signals having a rate equal to 2fs, and signal processing means supplied with the primary color digital image signals from said first rate converting means for forming digital composite video signals at the 2fs rate from said primary color digital image signals, said color television camera also comprising an adapter portion detachably mounted to said camera portion and including digital low-pass filter means supplied with said digital composite video signals from said signal processing means for limiting the pass band of said digital composite video signals to about less than fs/2, and second rate converting means coupled to said digital low-pass filter means for converting the rate of the pass band limited digital composite video signals to fs.

11. A color television camera having image pickup means for providing three primary color image pickup signals at a predetermined rate fs, said color television camera comprising analog/digital converting means coupled to said image pickup means for digitizing the color image pickup signals at a clock rate equal to said rate fs,
- first rate converting means for interpolating and converting the digitized color image signals from said analog/digital converting means into three primary color digital image signals having a rate equal to 2fs,
- signal processing means coupled to said first rate converting means and responsive to the three primary color digital image signals for producing digital composite video signals at the 2fs rate, digital color difference signals at the fs rate and digital luminance signals at the 2fs rate,
- digital low-pass filter means coupled to said signal processing means for limiting the digital composite video signals to a frequency range of less than about fs/2,
- second rate converting means coupled to said digital low-pass filter means for converting the rate of the band pass limited digital composite video signals to fs,
- first analog/digital converting means coupled to said signal processing means for converting the digital composite video signals at the 2fs rate into analog form to provide an analog composite video signal output,
- second analog/digital converting means coupled to said first converting means for converting the three primary color digital image signals at the 2fs rate into analog signals,
- third analog/digital converting means coupled to said signal processing means for converting the digital color difference signals into analog signals, and
- fourth analog/digital converting means coupled to said signal processing means for converting the digital luminance signals into analog signals.

12. A color television camera having image pickup means for providing three primary color image pickup signals at a predetermined rate fs, said color television camera comprising:
- analog/digital converting means coupled to said image pickup means for digitizing the color image pickup signals at a clock rate equal to said rate fs,
- first rate converting means coupled to said analog/-digital converting means for interpolating and converting the digitized color image signals into three primary color digital image signals each having a rate equal to 2fs,
- luminance signal forming means coupled to said first rate converting means for forming a digital luminance signal at the 2fs rate from said three primary color digital image signals,
- color difference signal forming means coupled to said first rate converting means for forming digital color difference signals at the fs rate from said three primary color digital image signals,
- modulating means coupled to said color difference signal forming means for modulating said digital color difference signals,
- second rate converting means coupled to said modulating means for converting the rate of said modulated digital color difference signals from fs to 2fs,
- composite video signal forming means coupled to said luminance signal forming means and said second rate converting means to form a digital composite video signal from said digital luminance signal and from said rate converted modulated digital color difference signals,
- digital/analog converting means coupled to said composite video signal forming means for converting said digital composite video signal into an analog form, and
- a low-pass filter means coupled to said digital/analog converting means to pass a signal component of a frequency lower than fs.

13. The color television camera according to claim 12 wherein said color difference signal forming means includes pre-filter means for downsampling the three primary color digital image signals produced by said first rate converting means to the fs rate, said pre-filter means having a zero point at least at the frequency fs.

14. The color television camera according to claim 12 wherein said second rate converting means comprises digital filter means to pass an fsc component and inhibit an fs-fsc component, wherein fsc is the frequency of the color subcarrier of the analog video signal.

15. The color television camera according to claim 12 wherein said second rate converting means comprises digital filter means having a practically zero differential coefficient at the color subcarrier frequency fsc of the analog video signal and having at least one zero point in the vicinity of the fs-fsc frequency component.

16. The color television camera according to claim 12 wherein said image pickup means includes a first solid-state image pickup element for imaging a green image, a second solid-state image pickup element for imaging a red image and a third solid-state image pickup element for imaging a blue image, said first solid-state image pickup element being offset relative to said second and third solid-state image pick-up elements by an amount equal to one half of a pixel pitch.

* * * * *